United States Patent [19]

Hunter et al.

[11] Patent Number: 5,236,598
[45] Date of Patent: Aug. 17, 1993

[54] METHODS FOR REMOVING SOLIDS FROM WATER-BASED PAINT SYSTEMS

[75] Inventors: Wood E. Hunter; Lewis D. Morse, both of Pittsburgh, Pa.

[73] Assignee: Calgon Corporation, Pittsburgh, Pa.

[21] Appl. No.: 961,731

[22] Filed: Oct. 15, 1992

[51] Int. Cl.⁵ ............................................. C02F 1/56
[52] U.S. Cl. ..................................... 210/705; 210/712; 210/727; 210/731; 210/734; 210/725; 210/930; 134/38; 427/331; 95/196; 95/197
[58] Field of Search ............... 210/930, 723, 727, 731, 210/724, 725, 734, 705, 712; 55/85; 134/38; 427/331

[56] References Cited

U.S. PATENT DOCUMENTS

| | | | |
|---|---|---|---|
| 3,515,575 | 6/1979 | Arnold | 210/930 |
| 3,674,725 | 7/1972 | Aitken et al. | 106/210 |
| 3,854,970 | 12/1974 | Aitken | 106/210 |
| 4,568,721 | 2/1986 | Fong et al. | 525/54.26 |
| 4,656,059 | 4/1987 | Mizuno et al. | 210/729 |
| 4,913,825 | 4/1990 | Mitchell | 210/705 |
| 4,935,149 | 6/1990 | Morse | 210/712 |

FOREIGN PATENT DOCUMENTS

| | | | |
|---|---|---|---|
| 0293129 | 11/1988 | European Pat. Off. | |
| 2027684 | 2/1980 | United Kingdom | 210/731 |

Primary Examiner—Stanley S. Silverman
Assistant Examiner—Neil M. McCarthy
Attorney, Agent, or Firm—W. C. Mitchell; C. M. Caruso

[57] ABSTRACT

A novel method of treating circulating water containing over-sprayed, water-borne paint, such as in a paint spray booth operation, comprises adjusting the alkalinity of the paint spray booth water to between about 20 and 600 ppm, on a calcium carbonate basis, by adding a designated alkalinity source thereto, adding a cationic potato starch to the water, contacting the over-sprayed, water-borne paint with the alkalinity-adjusted paint spray booth water after addition of the cationic potato starch, adding an effective amount of a polymer floccing agent to the paint spray booth water, and removing resulting sludge from the paint spray booth water.

7 Claims, No Drawings

METHODS FOR REMOVING SOLIDS FROM WATER-BASED PAINT SYSTEMS

FIELD OF THE INVENTION

The present invention relates to methods of treating circulating water containing over-sprayed, water-borne paint, for example, circulating water in a wet paint spray booth operation.

BACKGROUND OF THE INVENTION

Automobile bodies and many industrial and consumer articles are conventionally spray painted in areas called spray booths, wherein water curtains are employed to cleanse the air of over-sprayed paint. The wash water is then treated to remove paint solids, and the treated water is recirculated.

A water curtain may be created by pumping water into a trough above the over spray area or by the use of spray nozzles. Fine droplets of over sprayed paint, emitted by a spray gun, contact and are captured by the water curtain. The amount of paint contacting a water curtain may change depending on a number of variables, including plant or process shutdowns, the size and shape of the object being painted, the type of spray equipment used, the spraying and purge technique used, and the water flow and the type of paint used.

In the past, solvent-based paints have commonly been employed in spray booths. However, in response to federal regulations limiting the amount of volatile hydrocarbons (i.e., the solvent diluent used in solvent-based paint) which can be emitted from a plant site, water-based paints are now being used in spray booth operations.

The term "water-based paints", as used herein, refers to all varieties of coatings which contain in excess of approximately 10% water in the coating formulation, including, but not limited to, water-reducible alkyl and epoxy ester compositions, water-borne thermoplastic latex compositions using acrylic polymer/copolymers, water-based latexes of polyurethane dispersions, and blends of such compositions. As used herein, the terms "water-based paints" and "water-borne paints" are synonymous.

When treating paint spray booth water that contains over-sprayed water-based paints, a primary objective is to capture and collect the finely dispersed paint solids. Uncaptured solids tend to accumulate in the system and settle in sludge recovery pits and booth weirs. Such solids encourage the growth of anaerobic bacteria colonies which may result in odor problems. This treatment problem is aggravated with paints that are water-based because they are more hydrophilic than solvent-based paints, i.e., they contain resins and dyes which are more compatible with water.

Other problems which severely interfere with spray booth operations occur in areas of high agitation where foaming occurs and in areas where foam accumulates. Foaming is caused by chemical additives, surfactants, solvents or combinations thereof. Finely dispersed paint solids which are not captured and removed tend to stabilize foam, which aggravates foaming problems. Foaming generally mandates that copious amounts of defoamers be used, which results in higher operating costs. Water-based paints generally tend to cause foaming to a greater extent than solvent-based paints.

A wide variety of chemicals have been proposed as treating agents for circulating wet spray booth waters containing over-sprayed paint, including compositions containing polymers and amphoteric metal salts which form insoluble hydroxides at pH's greater than about 7. The use of combinations of this type are described in the following U.S. Pat. Nos. 3,861,887 to Forney; 3,990,986 to Gabel et al.; 4,002,490 to Michalski et al.; 4,130,674 to Roberts et al.; and 4,440,647 to Puchalski. Further, U.S. Pat. No. 4,637,824 to Pominvllle discloses the use of silicates and polydiallyldialkylammonium halides with amphoteric metal salts, and U.S. Pat. No. 4,853,132 to Merrell et al. discloses the use of precipitates formed by the reaction of cationic polymers and salts of inorganic anions to detackify solvent-borne paints. Bentonite clays, aluminum salts and zinc salts have also been used with cationic polymers.

U.S. Pat. to 4,913,825 Mitchell discloses the use of dialkylamine-epihalohydrin polymers in combination with modified tannin and/or a melamine formaldehyde-type polymer in paint spray booth operations. This patent also mentions cationic starches at column 7, lines 10-15.

U.S. Pat. No. 4,656,059 to Mizuno et al. relates to the use of melamine-aldehyde acid colloid solutions for treating paint in wet spray booths; U.S. Pat. No. 4,629,572 to Leitz et al. relates to the use of urea or amino triazine-aldehyde condensation reaction products in combination with water-swellable clays to treat paint spray booth wastes; and copending applications U.S. Ser. No. 588,997 and 475,670 relate to melamine formaldehyde/alkalinity-based methods for treating oversprayed water-based paints.

The instant invention represents a novel approach relative to the inventions of the prior art in that cationic potato starch/hydrolyzed polyacrylamide-based systems are used to treat circulating paint spray booth waters containing over-sprayed water-borne paints.

Cationic starches are well known, particularly in papermaking applications. See, for example, U.S. Pat. Nos. 2,884,395, 3,674,725, 3,854,970 and 4,568,721.

SUMMARY OF THE INVENTION

The instant invention relates to a novel method of treating water that contains water-borne paints which involves the application of a cationic potato starch in conjunction with a hydrolyzed polyacrylamide flocculant and a designated alkalinity source to the water within designated operating ranges. Such water, after being treated to capture and collect the over-sprayed water-borne paint contained therein, is typically recirculated in paint spray booth operations.

More particularly, the present invention relates to a method of treating circulating paint spray booth water containing over-sprayed water-borne paint to facilitate removal of the paint from the water. The method comprises adjusting the alkalinity of the circulating paint spray booth water being treated to between about 20 and 600 ppm, on a calcium carbonate basis, by adding a designated alkalinity source thereto; adding an effective amount of a cationic potato starch to the water being treated; contacting over-sprayed, water-borne paint with the alkalinity-adjusted paint spray booth water after the addition of an effective amount of the cationic potato starch to the paint spray booth water; adding an effective amount of a hydrolyzed polyacrylamide flocculant to the alkalinity and cationic starchtreated and paint-containing paint spray booth water; and removing resulting sludge from the water. The methods of the present invention are highly efficient for treating systems containing a wide variety of water-based paints. Additionally, the present methods generally produce a low-volume, flocculated, predominantly organic sludge which may be readily disposed of in land fills or by incineration.

These and additional advantages will be more apparent in view of the following detailed description.

DETAILED DESCRIPTION

The present invention relates to a method for treating circulating paint spray booth water containing over-sprayed, water-based paint to facilitate the removal of the paint from the water being treated. The present method comprises: (I) adjusting the alkalinity of the water in the aqueous system being treated, namely circulating paint spray booth water, to between 20 to 600 ppm, on a calcium carbonate basis, and preferably to between 50 to 400 ppm, by the addition of an alkalinity agent selected from the group consisting of carbonates, particularly a sodium carbonate, and borax; (II) adding to the water an effective amount of a cationic potato starch; (III) contacting the over-sprayed, water-borne paint with the alkalinity-adjusted water after the addition of an effective amount of the cationic potato starch; (IV) adding a polyacrylamide or hydrolyzed polyacrylamide flocculant to the water being treated after the over-sprayed, water-borne paint contacts the alkalinity and cationic starch treated water; and (V) removing resulting sludge from the water being freated.

Before over-sprayed, water-borne paint contacts paint spray booth water, the alkalinity of the water in the paint spray booth system being treated is preferably adjusted to provide a minimum alkalinity of about 20 ppm (as $CaCO_3$) to a maximum alkalinity of about 600 ppm. More preferably, the alkalinity should be maintained between about 50 and about 400 ppm (as $CaCO_3$) and most preferably between about 100 and 200 ppm (as $CaCO_3$). These alkalinity ranges are generally critical. At higher alkalinity dosages, paint solids become increasingly difficult to capture, which decreases separation efficiency. At even higher dosages, the paint solids tend to sink instead of float. If sufficient alkalinity is not present (i.e., below about 20 ppm), the cationic potato starch is not as effective, possibly resulting in poor collection efficiency. It is noteworthy that, not all alkalinity sources are suitable. Preferred alkalinity sources are selected from the group consisting of carbonates, such as sodium carbonate, and borax. NaOH is not suitable for use in the instant methods.

Additionally, the pH of the water being treated should be maintained between about 6.0 and about 8.0, preferably between about 6.0 and about 7.5. A pH of at least about 6.0 is desirable in order to activate the cationic potato starch. As the pH is lowered below about 6.0, corrosion in the system generally increases. On the other hand, a pH of greater than about 8.0 generally results in greater solids dispersion, thus creating less efficient solids capture, and causes greater foam generation.

Alkalinity can be added in the form of borax or carbonates, particularly alkali metal carbonates and alkali metal bicarbonates such as sodium carbonate or sodium bicarbonate and/or blends thereof. Preferred alkalinity sources include alkali metal carbonates, with sodium carbonate, sodium bicarbonate, and mixtures thereof being especially preferred. These alkalinity sources are generally inexpensive and safe to use, and they provide excellent flotation to the water-based paint solids when used in combination with polymeric flocculants. Thus, alkalinity, particularly carbonate alkalinity, assists in floating the flocculated paint particles to the surface of the water system being treated.

The alkalinity should be adjusted so that the water forming the curtain which contacts the over-sprayed paint or paints is in the designated alkalinity range. Any method of adding the source of alkalinity can be used, including batch or continuous addition, with continuous addition being preferred.

In addition to the alkalinity requirement, an effective amount of a cationic potato starch should be added to or maintained in the water being treated. As used herein, the term "effective amount" refers to that amount of cationic potato starch which achieves the desired water clarity and paint solids capture after addition of flocculant to the system being treated.

Cationic potato starches are well known and commercially available. For example, the HI-CAT TM series of cationic potato starches, which are available from Roquette Corporation, are suitable for use in the instant method.

Cationized potato starches may be prepared by conventional means. For example, unmodified potato starches can be cationized by reacting them with a cationic polymer under aqueous, alkaline conditions. Suitable cationic polymers include polymerization products of polyepihalohydrin with a tertiary amine.

The degree of substitution of the cationic moiety may vary from about 0.01 to about 0.8 moles of amine per chlorine-equivalent in modifying the starch, preferably from about 0.01 to about 0.20.

The instant cationic potato starches are insoluble in water. They are therefore best utilized in solutions wherein the cationic potato starch is in a fine colloidal state of suspension, and a preservative may be added to achieve this.

The percent by weight of cationic potato starch in a stabilized suspension or solution should range from about 0.1% to about 20%, preferably 1% to about 15%, and most preferably about 2% to about 5%, due to cost and product stability considerations.

The molecular weight of the cationic potato starch is not believed to be critical.

The cationic potato starch can be applied intermittently or continuously to the water system being treated. Since paint spraying is generally continuous, continuous addition of the cationic potato starch is preferred. The cationic potato starch may be added at any convenient location, but is preferably added so as to allow the maximum concentration of the cationic starch to contact the over-sprayed paint(s). For example, the cationic starch may be added to a line supplying the trough or other device used to form the water curtain. Multiple points of addition may be used. In a typical paint spray booth operation, the return water from the booth generally encounters extreme turbulence. This turbulence improves the efficacy of the treatment by promoting intimate contact between the paint and the cationic starch.

The inventors have found cationic potato starches to be effective paint spray booth treatment agents. Other cationic starches, for example corn starches, are not suitable agents. Any suitable cationic moiety can be used for the substitution.

The cationic potato starch should be added to the water being treated in a preferred dosage range from between about 0.001 to about 1.0 part cationic potato starch per part paint, most preferably between about 0.01 and about 0.5 part cationic potato starch per part paint.

The alkalinity adjustment and cationic potato starch addition steps may be carried out simultaneously, noting, however, that alkalinity adjustment of the water occurs prior to contact between the over-sprayed paint and the circulated paint spray booth water. The key factor is that the over-sprayed paint contact water within the desired alkalinity range and which contains an effective amount of a cationic potato starch.

After over-sprayed, water-based paint contacts alkalinity and the cationic potato starch in the circulating water, a polymeric flocculant is added to the paint spray booth water system. The flocculant promotes the formation of a buoyant floc structure by binding the conditioned paint particles and incorporating air into the floc structure. The resulting floating floc facilitates the removal of paint solids from the circulating water system.

According to this invention, it has been found that both the type and the molecular weight of the polymeric flocculant used are important factors. A suitable flocculant for use with cationic potato starch paint detackification is a hydrolyzed polyacrylamide, preferably a 30% hydrolyzed polyacrylamide. Generally, a flocculant having a weight average molecular weights of at least $1 \times 10^6$ is preferred. More preferably, the molecular weight should be between about $1.5 \times 10^6$ and $1.7 \times 10^6$. The hydrolyzed polyacrylamide flocculant should be dispersed in water to make a final solution.

An effective amount of the polymeric flocculant should be added. The effective amount generally depends upon the quantity of cationic potato starch present in the system being treated. Preferably, the effective flocculant dosage will range from about 0.01 to about 150 parts of the polymeric flocculant per part cationic potato starch and more preferably, from about 0.1 to about 20 parts of the polymeric flocculant per part cationic potato starch.

The function of the polymeric flocculant is two-fold: it reacts with the cationic starch-treated paint solids to form a large, buoyant, easily captured floc, and it reduces or totally eliminates foam formation in the system by removing colloidal particulates present in the water.

A requirement of the present invention is that the flocculant be added to the paint spray booth water after the over-sprayed, water-borne paint is contacted with the alkalinity adjusted paint spray booth water and cationic potato starch. Once the cationic starch-treated paint solids have been contacted with at least one polymeric flocculant, the resulting sludge is removed from the water. This removal may be facilitated by any means known in the art, including, but not limited to, air flotation and filtration.

Other additives commonly used for the treatment of water containing over-sprayed paint may be used in conjunction with the instant method. For example, bentonite clays, carbon black, talc, gums starch, dextrin, lime, aluminum oxide, silica solids, and casein among other additives, may be used as additional process aids in conjunction with the primary steps of the instant method. Additives from the class of amphoteric metal salts, including, but not limited to, alum, aluminum chloride, ferric sulfate and ferric chloride, can also be used to enhance the performance of the instant invention.

The following examples are given for the purpose of illustrating the present invention and shall not be construed as being limitations on the scope or spirit of the instant invention. Unless otherwise specified, reference to percentage or parts are by weight.

EXAMPLE 1

6 g. of Roquette's HI-CAT ™ 142, a high viscosity, moderate charge density cationic potato starch, were dispersed in 294 g. deionized water, heated to 98° C. with stirring, and held at that temperature for 15 min. The system was allowed to cool with stirring, and at 50° C. or less, 1.4 g. Tektamer 38 was added as a preservative. This is designated "A" in the following table.

EXAMPLE 2

Polyacrylamide, 3.1–4.5 cps at 0.1% aqueous, was dispersed in water to make a 1% solution. This is designated "C" in the following table.

EXAMPLE 3

30% Hydrolyzed polyacrylamide of molecular weight 16,000,000 was dispersed in water to make a 0.046% solution. This is designated "D" in the following table.

EXAMPLE 4

Sodium carbonate (20% aqueous) and sodium tetraborate decahydrate (5% aqueous) are designated as "E" and "F", respectively, in the following table.

EXAMPLE 5

The invention was studied via a jar test for capability of forming floc. The jar test consisted of stirring vigorously with a magnetic stirring bar 200 ml. of cold tap water, made alkaline if called for, followed by addition of the paint kill polymer of Example 1. Then, 8 drops of BASF silver-metallic water-borne automobile paint was added and stirred for one minute. Then floccing polymer was added and stirred for 30 seconds.

| DOSAGE (ml) | Observations were as follows: Trial | | | | | |
|---|---|---|---|---|---|---|
|  | 1 | 2 | 3 | 4 | 5 | 6 |
| Alkali Solution | E/1.0 | E/1.0 | 0 | 0 | F/4.0 | F/2.0 |
| Floccing Agent | D/1.0 | D/2.0 | D/6.0 | D/2.0 | D/2.0 | D/2.0 |
| Cationic Starch | A/1.0 | A/2.0 | A/6.0 | A/2.0 | A/2.0 | A/2.0 |
| % Float | No Floc | No Floc | 100 | 100 | 100 | 100 |
| Floc Description | No Floc | No Floc | light, tight | light, tight | light, tight | light tight |
| Final Water Clarity of | | | | | | |

Trial 1: Cloudy
Trial 2: Very cloudy
Trial 3: Clear
Trial 4: Clear with some dispersed floc
Trial 5: Clear with some dispersed floc
Trial 6: Clear with some dispersed floc

What is claimed is:

1. A method of treating circulating paint spray booth water containing over-sprayed, water-borne paint, which comprises:
   (a) adjusting the alkalinity of said water to between about 20 and 600 ppm, on a calcium carbonate basis, by adding a source of alkalinity to said water selected from the group consisting of carbonates and borax;

(b) adding to said water an effective amount of a cationic potato starch;

(c) contacting over-sprayed, water-borne paint with the water after completing step (a) and step (b);

(d) adding an effective amount of a flocculant to said water after completing steps (a), (b) and (c); and (e) removing resulting sludge from the water.

2. A method as defined by claim 1, wherein the alkalinity of the water is adjusted to between about 50 and 400 ppm.

3. A method as defined by claim 1, wherein the pH of the water is maintained in the range of about 6.0 to about 8.0.

4. A method as defined by claim 1, wherein the alkalinity source is selected from the group consisting of carbonates.

5. A method as defined by claim 4, wherein the alkalinity source is selected from the group consisting of sodium carbonate, sodium bicarbonate and mixtures thereof.

6. A method as defined by claim 1, wherein the flocculant is a hydrolyzed polyacrylamide.

7. A method as defined by claim 6, wherein the flocculant has a weight average molecular weight in the range of about $1.5 \times 10^6$ to about $1.7 \times 10^6$.

* * * * *